United States Patent [19]
Hamada et al.

[11] Patent Number: 5,578,381
[45] Date of Patent: Nov. 26, 1996

[54] RELEASE COATING COMPOSITIONS

[75] Inventors: Yuji Hamada; Hideki Kobayashi; Wataru Nishiumi, all of Chiba Prefecture, Japan

[73] Assignee: Dow Corning Toray Silicone Co., Ltd., Tokyo, Japan

[21] Appl. No.: 521,159

[22] Filed: Aug. 30, 1995

[30] Foreign Application Priority Data

Aug. 31, 1994 [JP] Japan .................................. 6-230790

[51] Int. Cl.$^6$ ...................................... B32B 9/04
[52] U.S. Cl. ................ 428/447; 528/15; 528/12; 528/18; 528/21; 528/20; 528/35; 524/726; 524/755; 524/742; 524/773; 524/792; 524/862; 524/770; 524/765; 524/751; 427/387
[58] Field of Search .................... 528/15, 35, 20, 528/21, 12, 18; 524/792, 862, 770, 765, 755, 726, 751, 742, 773; 427/387; 428/447

[56] References Cited

U.S. PATENT DOCUMENTS

| | | | |
|---|---|---|---|
| 4,889,753 | 12/1989 | Brown et al. | 428/40 |
| 4,985,526 | 1/1991 | Kishita et al. | 528/15 |
| 5,087,720 | 2/1992 | Kishita et al. | 556/434 |
| 5,117,025 | 5/1992 | Takago et al. | 556/434 |
| 5,264,522 | 11/1993 | Mize et al. | 528/15 |
| 5,386,007 | 1/1995 | Herzig et al. | 528/12 |
| 5,478,907 | 12/1995 | Kozakai | 528/15 |

FOREIGN PATENT DOCUMENTS

| | | |
|---|---|---|
| 487079 | 5/1992 | European Pat. Off. . |
| 48901 | 10/1988 | Japan . |

*Primary Examiner*—Melvyn I. Marquis
*Attorney, Agent, or Firm*—Timothy J. Troy

[57] ABSTRACT

The present invention relates to a release coating composition comprising an organopolysiloxane having fluorine containing organic groups and alkenyl groups, an organohydrogensiloxane, and a platinum-containing catalyst. The present invention also relates to a release coating composition comprising an organopolysiloxane having fluorine containing organic groups and silicon-bonded hydrogen groups, an alkenyl functional organopolysiloxane, and a platinum-containing catalyst. The curable silicone release coating compositions of this invention have excellent release properties from various tacky substances, especially silicone-based pressure sensitive adhesives, after curing, and also have excellent bonding characteristics when applied to various substrates.

25 Claims, No Drawings

RELEASE COATING COMPOSITIONS

BACKGROUND OF THE INVENTION

The present invention relates to release coating compositions, and more specifically relates to release coating compositions which form cured coatings having a low surface tension, and which have excellent release from various tacky substances such as pressure sensitive adhesives.

It is well known that by applying a curable release coating on the surface of various substrates such as paper, synthetic resin film, paper, or synthetic fiber cloth, a material having the capability of releasing from tacky substances such as pressure sensitive adhesives is obtained.

It has also been disclosed that organopolysiloxanes can be used in curable release coating compositions. For example, in Japanese Patent Application Publication No. 63-48901 (48,901/1988) curable release coating compositions containing a vinyl functional organopolysiloxane, an organohydrogenpolysiloxane, a perfluoroalkyl compound, and platinum catalyst are disclosed. Also, in Japanese Patent Application Laid-Open No. 63-320 (320/1988), is disclosed a curable release coating composition containing fluoroalkyl functional and vinyl functional organopolysiloxane, an organohydrogenpolysiloxane, and platinum catalyst.

Although the cured coatings from these compositions show excellent release from common organic resin type tacky substances, they have inferior release properties when the tacky substance is a silicone-based tacky material containing an organopolysiloxane, and thus they have not been acceptable for use in many of these types of applications.

In Japanese Patent Application Laid-Open No. 4-185678 (185,678/1992) is disclosed a curable release coating composition containing an organopolysiloxane having fluorine atom-containing organic groups and two or more alkenyl groups, an organohydrogenpolysiloxane, a trifluorochloroethylene resin, a platinum catalyst, and an organic solvent. In this composition however, the use of an organic solvent is essential which creates problems since chlorine-based solvents such as trichloroethane are regulated for environmental protection, and aliphatic hydrocarbons such as hexane or isooctane have low flashpoints.

In Japanese Patent Application Laid-Open No. 64-74268 (74,268/1989) is disclosed a curable silicone composition containing a perfluoropolyether functional organopolysiloxane. However, the perfluoropolyether functional organopolysiloxane requires extensive time to manufacture it and therefore is expensive, and thus the final curable silicone composition is very expensive to produce.

SUMMARY OF THE INVENTION

The present invention relates to a release coating composition comprising an organopolysiloxane having fluorine containing organic groups and alkenyl groups, an organohydrogensiloxane, and a platinum-containing catalyst.

The present invention also relates to a release coating composition comprising an organopolysiloxane having fluorine containing organic groups and silicon-bonded hydrogen groups, an alkenyl functional organopolysiloxane, and a platinum-containing catalyst.

It is an object of the present invention to produce a curable silicone release coating composition which has excellent release properties from various tacky substances after curing.

It is a further object of this invention to produce a silicone release coating which has very stable release characteristics from tacky substances after curing, such as pressure sensitive adhesives, especially silicone-based pressure sensitive adhesives, and also has excellent bonding characteristics when applied to various substrates.

DETAILED DESCRIPTION OF THE INVENTION

The present invention relates to a curable silicone release coating composition comprising: (A) 100 parts by weight of an organosilicon compound having its unit formula selected from:

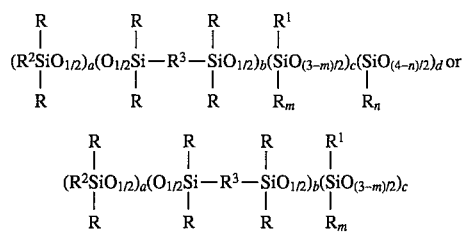

wherein R is a monovalent hydrocarbon group having from 1 to 10 carbon atoms and free of aliphatic unsaturation, $R^1$ is a fluorine-containing monovalent organic group having from 6 to 16 carbon atoms and having at least 4 —$CF_2$— groups, $R^2$ is selected from R or an alkenyl group having from 2 to 10 carbon atoms, $R^3$ is an alkylene group having from 2 to 10 carbon atoms, a, b, c, and d are positive numbers, m has a value of 0 or 1, n is an integer having a value of 0 to 2, and wherein the organosilicon compound has a weight average molecular weight of at least 1,000, with the proviso that there is at least two silicon-bonded alkenyl groups per molecule, (B) 0.3 to 40 parts by weight of an organohydrogenpolysiloxane having at least 3 silicon-bonded hydrogen atoms per molecule, and (C) 0.1 to 1,000 parts by weight of a platinum-containing catalyst, said weight being based on the parts by weight of platinum per one million parts by weight of the total of (A) and (B).

In the formula for component (A) above, R is a monovalent hydrocarbon group free of aliphatic unsaturation which is exemplified by alkyl groups such as methyl, ethyl, propyl, butyl, pentyl, or octyl, aryl groups such as phenyl, tolyl, or xylyl, an aralkyl group such as benzyl or phenethyl, or a haloalkyl group such as 3-chloropropyl or 3,3,3-trifluoropropyl. It is preferred that R is methyl.

In the formula for (A) above, $R^1$ is a fluorine-containing monovalent organic group having from 6 to 16 carbon atoms and having at least 4 —$CF_2$— groups. Thus $R^1$ is exemplified by a group having the formula $C_pF_{2p+1}$—X— wherein p has a value of at least 4, X is an alkylene group exemplified by methylene, ethylene, propylene, or butylene, by a group having the formula $C_pF_{2p+1}$—X—O—X— wherein p and X are as defined above, or by a group having the formula:

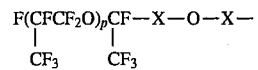

wherein p and X are as defined above.

In the formula for (A), $R^2$ is selected from R, as defined above, or an alkenyl group having from 2 to 10 carbon atoms. The alkenyl groups are exemplified by vinyl, allyl, butenyl, pentenyl, hexenyl, or octenyl. The group $R^3$ in the formula for (A) denotes an alkylene group having from 2 to 10 carbon atoms and is exemplified by ethylene, propylene, butylene, pentylene, hexylene, or octylene. In component (A), a, b, c, and d are positive numbers, m has a value of 0 or 1, and n is an integer having a value of 0 to 2. There must be at least two silicon-bonded alkenyl groups per molecule of (A).

The viscosity of (A) is not particularly limited, however, the viscosity at 25° C. preferably ranges from 10 to 10,000 mm$^2$/s (1 mm$^2$/s=1 centistoke (cS)) to ensure good handling and workability of the curable silicone release coating composition and good physical properties in the coating after it is cured. Also, the surface tension and release characteristics of the cured coating can be adjusted by altering the content of the fluorine-containing monovalent organic group of R$^1$ in (A). In organosilicon compound (A), the content of fluorine atoms in R$^1$ is preferably at about 10 to 80 weight %, and more preferably is at 20 to 70 weight %.

The organosilicon compound (A) is exemplified by compounds having the formula:

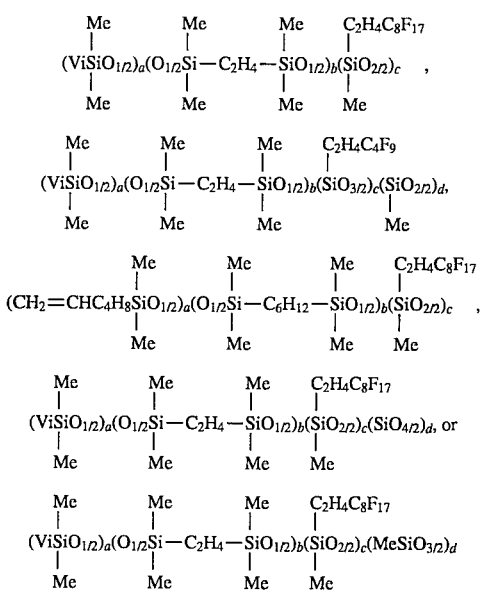

wherein Me denotes methyl, Vi denotes vinyl, Ph denotes phenyl, and a, b, c, and d are positive numbers.

Component (B), the organohydrogenpolysiloxane, is a crosslinking agent for component (A), and in order to function as the crosslinking agent, it must contain at least 3 silicon-bonded hydrogen atoms per molecule. Organohydrogenpolysiloxanes suitable as (B) are exemplified by trimethylsiloxy-endblocked dimethylsiloxane-methylhydrogensiloxane copolymers, dimethylhydrogensiloxy-endblocked methyl(perfluorobutylethyl)siloxane-methylhydrogensiloxane copolymers, trimethylsiloxy-endblocked methyl(perfluorobutylethyl)siloxane-dimethylsiloxane-methylhydrogensiloxane copolymers, trimethylsiloxy-endblocked methyl(perfluorohexylethyl)siloxane-methylhydrogenpolysiloxane copolymers, or copolymers comprising methyl(perfluorobutylethyl)siloxane units, dimethylhydrogensiloxane units and SiO$_2$ units.

The amount of (B) in the compositions of this invention is from 0.3 to 40 parts by weight against 100 parts by weight of (A). If less than 0.3 parts by weight is present, the curing rate of the coating becomes slow, and if the amount exceeds 40 parts by weight, then the release characteristics of the cured coating are adversely affected.

Component (C) in the present invention is a platinum-containing catalyst. Platinum-containing catalysts suitable as (C) are exemplified by fine particle platinum adsorbed on carbon powder, chloroplatinic acid, alcohol-modified chloroplatinic acid, complexes of chloroplatinic acid and olefins, complexes of chloroplatinic acid and vinylsiloxane, platinum black, palladium, or rhodium catalysts. The amount of catalyst (C) present is usually in the range of 0.1 to 1000 parts by weight, said weight being based on parts by weight of platinum metal per one million parts by weight of the total weight of (A) and (B).

In a second embodiment the present invention relates to a curable silicone release coating composition comprising:

(A') 100 parts by weight of an organosilicon compound having its unit formula selected from:

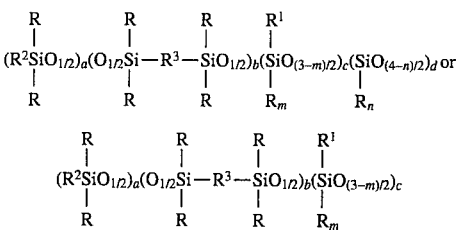

wherein R is a monovalent hydrocarbon group having from 1 to 10 carbon atoms and free of aliphatic unsaturation, R$^1$ is a fluorine-containing monovalent organic group having from 6 to 16 carbon atoms and having at least 4 —CF$_2$— groups, R$^2$ is selected from hydrogen or R, R$^3$ is an alkylene group having from 2 to 10 carbon atoms, a, b, c, and d are positive numbers, m has a value of 0 or 1, n is an integer having a value of 0 to 2, and wherein the organosilicon compound has a weight average molecular weight of at least 1,000 with the proviso that there is at least two silicon-bonded hydrogen groups per molecule, (B') 0.3–40 parts by weight of an organopolysiloxane having at least 3 silicon-bonded alkenyl groups per molecule, and (C') 0.1 to 1,000 parts by weight of a platinum-containing catalyst, said weight being based on the parts by weight of platinum per one million parts by weight of the total of (A') and (B').

In the formula for (A') above, K, R$^1$, R$^3$, a, b, c, d, m, and n are all as defined above for (A) in the first embodiment of this invention, including preferred embodiments thereof. It is preferred that R is methyl, and R$^3$ be selected from ethylene and hexylene. The group R$^2$ is selected from hydrogen or R, as defined above. There must be at least two silicon-bonded hydrogen groups per molecule of (A').

The viscosity of (A') is not particularly limited, however, the viscosity at 25° C. preferably ranges from 10 to 10,000 mm$^2$/s (1 mm$^2$/s=1 centistoke (cS)) to ensure good handling and workability of the curable silicone release coating composition and good physical properties in the coating after it is cured. Also, the surface tension and release characteristics of the cured coating can be adjusted by altering the content of the fluorine-containing monovalent organic group of R$^1$ in (A'). In organosilicon compound (A'), the content of fluorine atoms in R$^1$ is preferably at about 10 to 80 weight %, and more preferably is at 20 to 70 weight %.

The organosilicon compound (A') is exemplified by compounds having the formula:

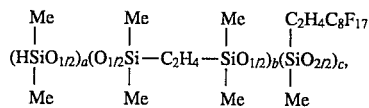

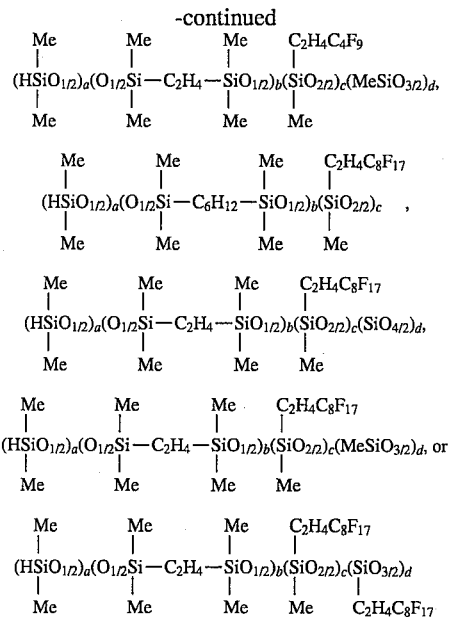

wherein Me denotes methyl, Ph denotes phenyl, and a, b, c, and d are positive numbers.

Component (B') is an organopolysiloxane having at least 3 silicon-bonded alkenyl groups per molecule. Organopolysiloxanes suitable as (B') are exemplified by dimethylvinylsiloxy-endblocked methylvinylpolysiloxanes, dimethylvinylsiloxy-endblocked dimethylsiloxane-methylvinylsiloxane copolymers, dimethylvinylsiloxy-endblocked methyl(perfluorobutylethyl)-siloxane-methylvinylsiloxane copolymers, trimethylsiloxy-endblocked methyl(perfluorobutylethyl)siloxane-dimethylsiloxane-methylvinylsiloxane copolymers, trimethylsiloxy-endblocked dimethylsiloxane-methylvinylsiloxane copolymers, trimethylsiloxy-endblocked methylvinylpolysiloxanes, trimethylsiloxy-endblocked methyl(perfluorohexylethyl)siloxane-methylvinylpolysiloxane copolymers, or copolymers comprising methyl(perfluorobutylethyl)-siloxane units, methylvinylsiloxane units, and SiO$_2$ units.

The amount of (B') is from 0.3 to 40 parts by weight per 100 parts by weight of (A'). If the amount of (B') is less than 0.3 part by weight, the curing rate of the coating becomes slow, and if the amount exceeds 40 parts by weight, then the release characteristics of the cured coating are adversely affected.

Component (C') is a platinum-containing catalyst. Platinum-containing catalysts suitable as (C') are exemplified by fine particle platinum adsorbed on carbon powder, chloroplatinic acid, alcohol-modified chloroplatinic acid, complexes of chloroplatinic acid and olefins, complexes of chloroplatinic acid and vinylsiloxanes, platinum black, palladium, or rhodium catalysts. The amount of catalyst (C') present is usually in the range of 0.1 to 1000 parts by weight, said weight being based on parts by weight of platinum metal per one million parts by weight of the total weight of (A') and (B').

Although the compositions of the present invention comprise components (A)–(C), or components (A')–(C') as described above, a small amount of inhibitor to inhibit the catalytic activity of the platinum-containing catalysts may be added, as needed, in order to improve the compositions storage stability. Suitable inhibitors include ethylenically or aromatically unsaturated amides, acetylenic compounds, ethylenically unsaturated isocyanates, olefinic siloxanes, unsaturated hydrocarbon diesters, conjugated ene-ynes, hydroperoxides, nitriles, and diaziridines.

Preferred inhibitors include acetylenic alcohols such as ethynylcyclohexanol, 3-methyl-1-butyn-3-ol, 3,5-dimethyl-1-hexyn-3-ol, 3-methyl-1-penten-3-ol, or phenylbutynol, unsaturated carboxylic esters such as diallyl maleate and dimethyl maleate, maleates and fumarates including diethyl fumarate, diallyl fumarate, and bis-(methoxyisopropyl)maleate, conjugated ene-ynes such as 3-methyl-3-penten-1-yne, 3,5-dimethyl-1-hexyn-3yne, cyclic tetramethylvinylsiloxanes, or benzotriazole. It is preferred that if an inhibitor is employed, the amount ranges from 0.5 to 10 weight percent, said weight percent being based on the total weight of the composition.

In addition, an organic solvent may be added to the compositions of the present invention in order to improve the coating characteristics of the composition of the present invention to various substrates. Suitable organic solvents include fluorine-containing aromatic hydrocarbons such as trifluoromethylbenzene, 1,3-bis(trifluoromethyl)benzene, or methylpentafluorobenzene, aromatic hydrocarbons such as benzene, toluene, or xylene, aliphatic hydrocarbons such as heptane, hexane, pentane, or isooctane, ketones such as acetone, methylethylketone, or methylisobutylketone, esters such as ethyl acetate or butyl acetate, ethers such as tetrahydrofuran, or diethylether, alcohols such as methanol, ethanol, propanol, or butanol, or compounds such as dimethylformamide or dimethylsulfoxide. Two or more of these organic solvents can be used in combination.

The compositions of the present invention can be obtained easily by uniform mixing of components (A)–(C), or (A')–(C'), as described above, and further adding an inhibitor or organic solvent to the components as needed. It is preferred, however, that after dissolving (A) and (C) in an organic solvent uniformly, that (B) is then added. It is also preferred that after dissolving (B') and (C') in an organic solvent uniformly, that (A') and the inhibitor are then added. In addition to the above mentioned ingredients, various additives can be added to the compositions of the present invention as long as the objective of the present invention is not impaired. For example, bath life extender compounds may be added in a total amount sufficient to further retard the curing reaction at room temperature such as water, tetradecanols, pentanols, hexanols, heptanols, octanols, benzyl alcohol, phenol, methylphenyl carbinol, 2-phenylethyl alcohol, allyl alcohol, or cyclohexanol. It is preferred that the bath life extender is benzyl alcohol or water. Preferably, the amount of bath life extender present ranges from 0.1 to 5 percent, by weight, based on the weight of Component (A) or Component (A'). Other additives include inorganic fillers such as fumed silica, hydrophobic silicas which have been surface-treated with various silylating agents or silane treatment agents, precipitated silica, fused silica, pulverized quartz, silica gel, silica balloons carbon black, mica, talc, calcium carbonate, glass fiber, iron oxide, titanium oxide, alumina, aluminum hydroxide, or diatomaceous earth, oils such as silicone oil, mineral oil, or hydrocarbon oil, coloring pigments, dyes, oxidation inhibitors, heat-resistant additives, or flame retardants can be added as long as the objective of the present invention is not impaired.

The compositions of this invention are coated onto the surface of various substrates such as paper, synthetic resin films, or cloth, and heated at temperatures of 120°–150° C. for about 20–30 minutes. A cured coating having low surface tension is thus obtained. The cured coating has very stable release characteristics from tacky substances such as pressure sensitive adhesives, and also shows good bonding to various substrates. In the Examples, parts denotes parts by weight, the viscosity is the value measured at 25° C., and Me denotes methyl.

The measurement of the contact angle was determined in the following manner. A fixed amount of a release coating composition was coated on the surface of synthetic resin film and was then heated in a hot air circulating oven at 150° C. until a completely cured coating was obtained. After keeping it at room temperature for an hour, drops of water, methylene iodide, and hexadecane were placed on the surface of the cured coating, and their contact angles were measured using a contact angle measurement apparatus. Since the contact angle is greater when the surface tension is lower, the contact angle was used as the measure of the surface tension of the coating.

The release resistance was measured in the following manner. A fixed amount of a release coating composition was coated on the surface of synthetic resin film and then heated in a hot air circulating oven at a set temperature for a set time, until a cured coating was obtained. The surface of the cured coating was then coated with a silicone resin-based tacky substance (a product of Dow Corning Toray Silicone Co., SD4580, having 1400 g/inch in bonding strength to a stainless steel plate), and heated at 100° C. for 2 minutes. Then, this treated surface was laminated with a piece of polyester resin film (a product of Toray Industries having the trade name Lumirror S-10), and aged under a load of 18 g/m² at 25° C. for a set time to prepare a sample for measurement. Subsequently, this sample for measurement was cut into 2.5 cm wide test pieces, and the force required for releasing (g) was measured by pulling the laminating film at 180 degree angle at a peel rate of 0.3 m/min using a tensile tester.

The residual adhesiveness was determined by taking the polyester resin film (Lumirror S-10), which was peeled off in the above release resistance measurement, and adhering it on a piece of stainless steel plate using a 2 Kg rubber roller. The force required to peel off this film (g) at 180 degree angle was measured at a peel rate of 0.3 m/min using a tensile tester, and the residual adhesiveness was expressed as the percentage of this force against the force required for the untreated standard tape using the following formula:

$$\text{residual adhesiveness (\%)} = \frac{\text{residual adhesive force}}{\text{initial adhesive force}} \times 100$$

Example 1

About 100 parts of an organosilicon compound having the average unit formula:

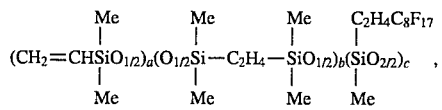

wherein the ratio of a/b/c was 1/4/4, and of the weight average molecular weight was 9,000, 8 parts of a trimethylsiloxy-endblocked methyl(perfluorobutylethyl)siloxane-methylhydrogensiloxane copolymer having a viscosity of 25 mm²/s, and 0.7 parts of cyclic tetra(methylvinylsiloxane) were dissolved in 2,000 parts of xylene hexafluoride. To this solution was added 20 ppm (as platinum metal) of a platinum complex formed from chloroplatinic acid and divinyltetramethyldisiloxane which resulted in the formation of a curable silicone release coating.

Subsequently, this composition was coated on the surface of polyethylene film at 0.2 g/m², and was cured completely at 140° C. Next, the contact angle of the coating surface was measured according to the method described above. Also, the coating was heated at 150° C. for 1 minute and the release resistance and the residual adhesiveness of the obtained cured coating were measured according to the method described above. The measurement results are shown in Tables 1 and Table 2.

TABLE 1

| Item | Contact angle (degree) | | |
|---|---|---|---|
| Classification | Water | Methylene iodide | Hexdecane |
| Example 1 | 111 | 83 | 41 |

TABLE 2

| Classification | Item Release resistance (g/2.5 cm) | Residual adhesiveness (%) |
|---|---|---|
| Example 1 | 4 | 98 |

Example 2

About 100 parts of an organosilicon compound having the average unit formula:

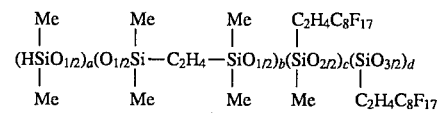

wherein the ratio of a/b/c/d is 2/5/1/1, and wherein the weight average molecular weight of the compound is 6,000, 4 parts of a dimethylvinylsiloxy-endblocked dimethylsiloxane-methylvinylsiloxane copolymer (having a vinyl content of about 4 weight %) having a viscosity of 10 mm²/s, and 1 part of cyclic tetra(methylvinylsiloxane) were dissolved in 2,100 parts of xylene hexafluoride. To this solution was added 10 ppm (as platinum metal) of a platinum complex formed from chloroplatinic acid and divinyltetramethyldisiloxane which resulted in the formation of a curable silicone release coating.

Subsequently, this composition was coated on the surface of polyethylene film at 0.3 g/m² and was cured completely at 140° C. The contact angle of the coated surface was then measured. Also, the coating was heated at 150° C. for 35 seconds and the release resistance and residual adhesiveness of the obtained cured coating were measured. These measurement results are shown in Table 3 and Table 4 hereinbelow.

TABLE 3

| Item | Contact angle (degree) | | |
|---|---|---|---|
| Classification | Water | Methylene iodide | Hexadecane |
| Example 2 | 110 | 83 | 40 |

TABLE 4

| Classification | Item Release resistance (g/2.5 cm) | Residual adhesiveness (%) |
|---|---|---|
| Example 2 | 5 | 98 |

That which is claimed is:

1. A curable silicone release coating composition comprising:

(A) 100 parts by weight of an organosilicon compound having its unit formula selected from:

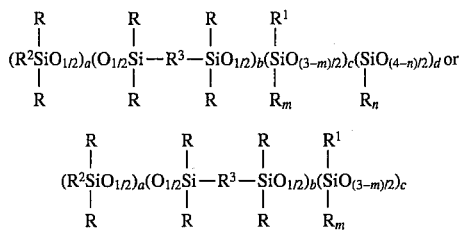

$$(R^2SiO_{1/2})_a(O_{1/2}Si{-}R^3{-}SiO_{1/2})_b(SiO_{(3-m)/2})_c(SiO_{(4-n)/2})_d \text{ or}$$

$$(R^2SiO_{1/2})_a(O_{1/2}Si{-}R^3{-}SiO_{1/2})_b(SiO_{(3-m)/2})_c$$

wherein R is a monovalent hydrocarbon group having from 1 to 10 carbon atoms and free of aliphatic unsaturation or a haloalkyl group, $R^1$ is a fluorine-containing monovalent organic group having from 6 to 16 carbon atoms and having at least 4 —$CF_2$— groups, $R^2$ is selected from R or an alkenyl group having from 2 to 10 carbon atoms, $R^3$ is an alkylene group having from 2 to 10 carbon atoms, a, b, c, and d are positive numbers, m has a value of 0 or 1, n is an integer having a value of 0 to 2, and wherein the organosilicon compound has a weight average molecular weight of at least 1,000, with the proviso that there is at least two silicon-bonded alkenyl groups per molecule;

(B) 0.3 to 40 parts by weight of an organohydrogenpolysiloxane having at least 3 silicon-bonded hydrogen atoms per molecule; and (C) 0.1 to 1,000 parts by weight of a platinum-containing catalyst, said weight being based on the parts by weight of platinum per one million parts by weight of the total of (A) and (B).

2. A composition according to claim 1, wherein R is selected from methyl, ethyl, propyl, butyl, pentyl, octyl, phenyl, tolyl, xylyl, benzyl, phenethyl, 3-chloropropyl, or 3,3 3-trifluoropropyl, $R^1$ is selected from a group having the formula $C_pF_{2p+1}{-}X{-}$, a group having the formula $C_pF_{2p+1}{-}X{-}O{-}X{-}$, or a group having the formula:

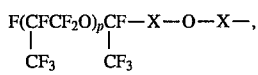

$$F(CFCF_2O)_pCF{-}X{-}O{-}X{-},$$
with $CF_3$ groups wherein p has a value of at least 4 and X is an alkylene group, $R^2$ is selected from vinyl, allyl, butenyl, pentenyl, hexenyl, or octenyl, and $R^3$ is selected from ethylene, propylene, butylene, pentylene, hexylene, or octylene.

3. A composition according to claim 2, wherein X is selected from methylene, ethylene, propylene, or butylene.

4. A composition according to claim 1 wherein (A) is an organosilicon compound having its unit formula selected from:

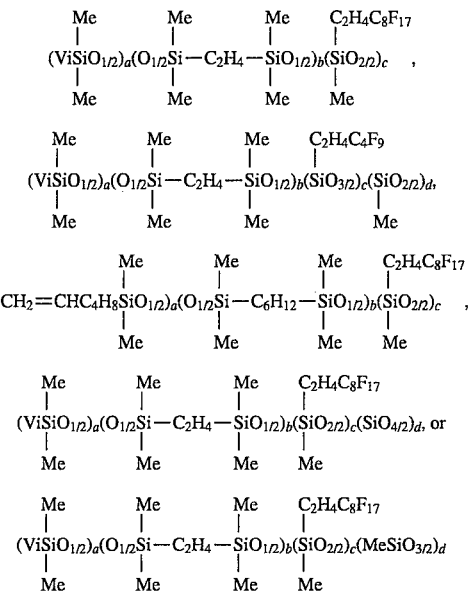

wherein Me denotes methyl, Vi denotes vinyl, Ph denotes phenyl, and a, b, c, and d are positive numbers.

5. A composition according to claim 1 wherein (B) is selected from trimethylsiloxy-endblocked dimethylsiloxane-methylhydrogensiloxane copolymers, dimethylhydrogensiloxy-endblocked methyl(perfluorobutylethyl)siloxane-methylhydrogensiloxane copolymers, trimethylsiloxy-endblocked methyl(perfluorobutylethyl)siloxane-dimethylsiloxane-methylhydrogensiloxane copolymers, trimethylsiloxy-endblocked methyl(perfluorohexylethyl)siloxane-methylhydrogenpolysiloxane copolymers, or copolymers comprising methyl(perfluorobutylethyl)siloxane units, dimethylhydrogensiloxane units, and $SiO_2$ units.

6. A composition according to claim 1, wherein (C) is selected from fine particle platinum adsorbed on carbon powder, chloroplatinic acid, alcohol-modified chloroplatinic acid, complexes of chloroplatinic acid and olefins, complexes of chloroplatinic acid and vinylsiloxane, or platinum black.

7. A composition according to claim 1, wherein the composition further comprises an inhibitor to inhibit the catalytic activity of platinum-containing catalyst (C).

8. A composition according to claim 7, wherein the inhibitor is selected from ethynylcyclohexanol, 3-methyl-1-butyn-3-ol, 3,5-dimethyl-1-hexyn-3-ol, 3-methyl-1-penten-3-ol, phenylbutynol, diallyl maleate, dimethyl maleate, diethyl fumarate, diallyl fumarate, bis-(methoxyisopropyl) maleate, 3-methyl-3-penten-1-yne, 3,5-dimethyl-1-hexyn-3-yne, cyclic tetramethylvinylsiloxanes, or benzotriazole.

9. A composition according to claim 1, wherein the composition further comprises an organic solvent selected from trifluoromethylbenzene, 1,3-bis(trifluoromethyl)benzene, methylpentafluorobenzene, benzene, toluene, xylene, heptane, hexane, pentane, isooctane, acetone, methylethylketone, methylisobutylketone, ethyl acetate, butyl acetate, tetrahydrofuran, diethylether, methanol, ethanol, propanol, butanol, dimethylformamide, dimethylsulfoxide, or mixtures thereof.

10. A composition according to claim 7, wherein the composition further comprises an organic solvent selected from trifluoromethylbenzene, 1,3-bis(trifluoromethyl)benzene, methylpentafluorobenzene, benzene, toluene, xylene, heptane, hexane, pentane, isooctane, acetone, methylethylketone, methylisobutylketone, ethyl acetate, butyl acetate, tetrahydrofuran, diethylether, methanol, ethanol, propanol, butanol, dimethylformamide, dimethylsulfoxide, or mixtures thereof.

11. A composition according to claim 7, wherein the composition further comprises a bath life extender compound in a total amount sufficient to further retard the curing reaction at room temperature.

12. A composition according to claim 11, wherein the bath life extender is selected from tetradecanols, pentanols, hexanols, heptanols, octanols, benzyl alcohol, water, phenol, methylphenyl carbinol, 2-phenylethyl alcohol, allyl alcohol, or cyclohexanol.

13. A curable silicone release coating composition comprising:

(A') 100 parts by weight of an organosilicon compound having its unit formula selected from:

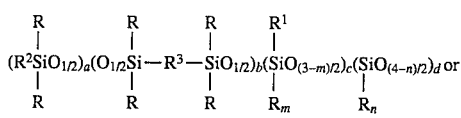

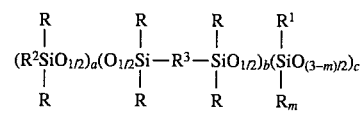

wherein R is a monovalent hydrocarbon group having from 1 to 10 carbon atoms and free of aliphatic unsaturation or a haloalkyl group, $R^1$ is a fluorine-containing monovalent organic group having from 6 to 16 carbon atoms and having at least 4 —$CF_2$— group $R^2$ is selected from hydrogen or R, $R^3$ is an alkylene group having from 2 to 10 carbon atoms, a, b, c, and d are positive numbers, m has a value of 0 or 1, n is an integer having a value of 0 to 2, and wherein the organosilicon compound has a weight average molecular weight of at least 1,000 with the proviso that there is at least two silicon-bonded hydrogen groups per molecule;

(B') 0.3–40 parts by weight of an organopolysiloxane having at least 3 silicon-bonded alkenyl groups per molecule; and (C') 0.1 to 1,000 parts by weight of a platinum-containing catalyst, said weight being based on the parts by weight of platinum per one million parts by weight of the total of (A') and (B').

14. A composition according to claim 13, wherein R is selected from methyl, ethyl, propyl, butyl, pentyl, octyl, phenyl, tolyl, xylyl, benzyl, phenethyl, 3-chloropropyl, or 3,3 3-trifluoropropyl, $R^1$ is selected from a group having the formula $C_pF_{2p+1}$—X—, a group having the formula $C_pF_{2p+1}$—X—O—X—, or a group having the formula:

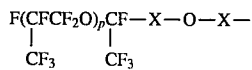

wherein p has a value of at least 4 and X is an alkylene group, and $R^3$ is selected from ethylene, propylene, butylene, pentylene, hexylene, or octylene.

15. A composition according to claim 13, wherein (A') is an organosilicon compound having its unit formula selected from:

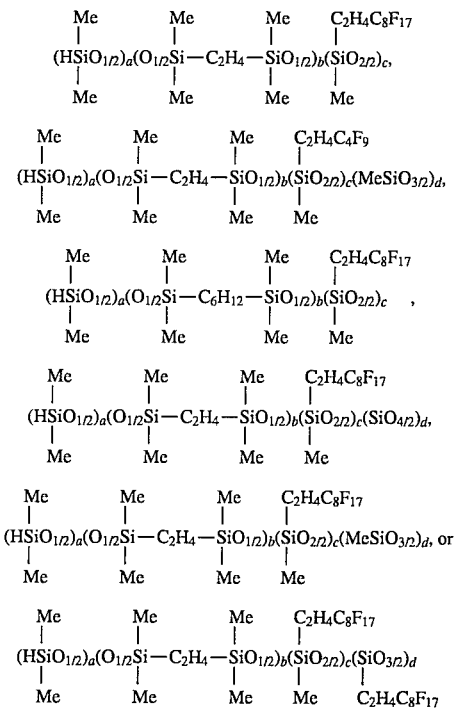

wherein Me denotes methyl, Ph denotes phenyl, and a, b, c, and d are positive numbers.

16. A composition according to claim 13, wherein (B') is selected from dimethylvinylsiloxy-endblocked methylvinylpolysiloxanes, dimethylvinylsiloxy-endblocked dimethylsiloxane-methylvinylsiloxane copolymers, dimethylvinylsiloxy-endblocked methyl(perfluorobutylethyl)siloxane-methylvinylsiloxane copolymers, trimethylsiloxy-endblocked methyl(perfluorobutylethyl)siloxane-dimethylsiloxane-methylvinylsiloxane copolymers, trimethylsiloxy-endblocked dimethylsiloxane-methylvinylsiloxane copolymers, trimethylsiloxy-endblocked methylvinylpolysiloxanes, trimethylsiloxy-endblocked methyl(perfluorohexylethyl)siloxane-methylvinylpolysiloxane copolymers, or copolymers comprising methyl(perfluorobutylethyl)siloxane units, methylvinylsiloxane units, and $SiO_2$ units.

17. A composition according to claim 13, wherein (C') is selected from fine particle platinum adsorbed on carbon powder, chloroplatinic acid, alcohol-modified chloroplatinic acid, complexes of chloroplatinic acid and olefins, complexes of chloroplatinic acid and vinylsiloxanes, or platinum black.

18. A composition according to claim 13, wherein the composition further comprises an inhibitor to inhibit the catalytic activity of platinum-containing catalyst (C').

19. A composition according to claim 18, wherein the inhibitor is selected from ethynylcyclohexanol, 3-methyl-1-butyn-3-ol, 3,5-dimethyl-1-hexyn-3-ol, 3-methyl-1-penten-3-ol, phenylbutynol, diallyl maleate, dimethyl maleate, diethyl fumarate, diallyl fumarate, bis-(methoxyisopropyl) maleate, 3-methyl-3-penten-1-yne, 3,5-dimethyl-1-hexyn-3-yne, cyclic tetramethylvinylsiloxanes, or benzotriazole.

20. A composition according to claim 13, wherein the composition further comprises an organic solvent selected from trifluoromethylbenzene, 1,3-bis(trifluoromethyl)benzene, methylpentafluorobenzene, benzene, toluene, xylene, heptane, hexane, pentane, isooctane, acetone, methylethylketone, methylisobutylketone, ethyl acetate, butyl acetate, tetrahydrofuran, diethylether, methanol, ethanol, propanol, butanol, dimethylformamide, dimethylsulfoxide, or mixtures thereof.

21. A composition according to claim 18, wherein the composition further comprises an organic solvent selected from trifluoromethylbenzene, 1,3-bis(trifluoromethyl)benzene, methylpentafluorobenzene, benzene, toluene, xylene, heptane, hexane, pentane, isooctane, acetone, methylethylketone, methylisobutylketone, ethyl acetate, butyl acetate, tetrahydrofuran, diethylether, methanol, ethanol, propanol, butanol, dimethylformamide, dimethylsulfoxide, or mixtures thereof.

22. A composition according to claim 18, wherein the composition further comprises a bath life extender compound in a total amount sufficient to further retard the curing reaction at room temperature.

23. A composition according to claim 22, wherein the bath life extender is selected from tetradecanols, pentanols, hexanols, heptanols, octanols, benzyl alcohol, water, phenol, methylphenyl carbinol, 2-phenylethyl alcohol, allyl alcohol, or cyclohexanol.

24. A cured coating prepared by:

(I) coating a curable silicone release coating composition on the surface of a substrate wherein the coating composition comprises:

(A) 100 parts by weight of an organosilicon compound having its unit formula selected from:

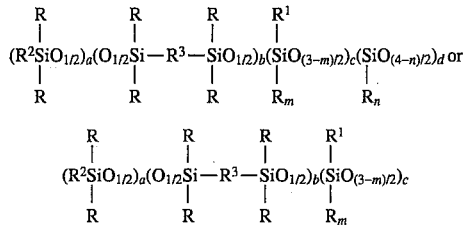

wherein R is a monovalent hydrocarbon group having from 1 to 10 carbon atoms and free of aliphatic unsaturation, $R^1$ is a fluorine-containing monovalent organic group having from 6 to 16 carbon atoms and having at least 4 —$CF_2$ groups, $R^2$ is selected from R or an alkenyl group having from 2 to 10 carbon atoms, $R^3$ is an alkylene group having from 2 to 10 carbon atoms, a, b, c, and d are positive numbers, m has a value of 0 or 1, n is an integer having a value of 0 to 2, and wherein the organosilicon compound has a weight average molecular weight of at least 1,000, with the proviso that there is at least two silicon-bonded alkenyl groups per molecule;

(B) 0.3 to 40 parts by weight of an organohydrogenpolysiloxane having at least 3 silicon-bonded hydrogen atoms per molecule; and (C) 0.1 to 1,000 parts by weight of a platinum-containing catalyst, said weight being based on the parts by weight of platinum per one million parts by weight of the total of (A) and (B); and (II) exposing the coating and the substrate to heat in an amount sufficient to cure the coating.

25. A cured coating prepared by:

(I) coating a curable silicone release coating composition on the surface of a substrate wherein the coating composition comprises:

(A') 100 parts by weight of an organosilicon compound having its unit formula selected from:

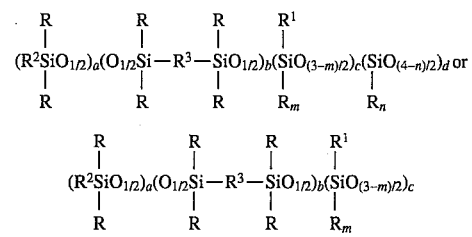

wherein R is a monovalent hydrocarbon group having from 1 to 10 carbon atoms and free of aliphatic unsaturation, $R^1$ is a fluorine-containing monovalent organic group having from 6 to 16 carbon atoms and having at least 4 —$CF_2$— groups, $R^2$ is selected from hydrogen or R, $R^3$ is an alkylene group having from 2 to 10 carbon atoms, a, b, c, and d are positive numbers, m has a value of 0 or 1, n is an integer having a value of 0 to 2, and wherein the organosilicon compound has a weight average molecular weight of at least 1,000 with the proviso that there is at least two silicon-bonded hydrogen groups per molecule;

(B') 0.3–40 parts by weight of an organopolysiloxane having at least 3 silicon-bonded alkenyl groups per molecule; and (C') 0.1 to 1,000 parts by weight of a platinum-containing catalyst, said weight being based on the parts by weight of platinum per one million parts by weight of the total of (A') and (B'); and (II) exposing the coating and the substrate to heat in an amount sufficient to cure the coating.

* * * * *